June 20, 1967           J. STEWART           3,326,037

ULTRASONIC EXAMINATION APPARATUS

Filed March 17, 1964           3 Sheets-Sheet 1

INVENTOR

John Stewart

BY *J. P. Moran*

ATTORNEY

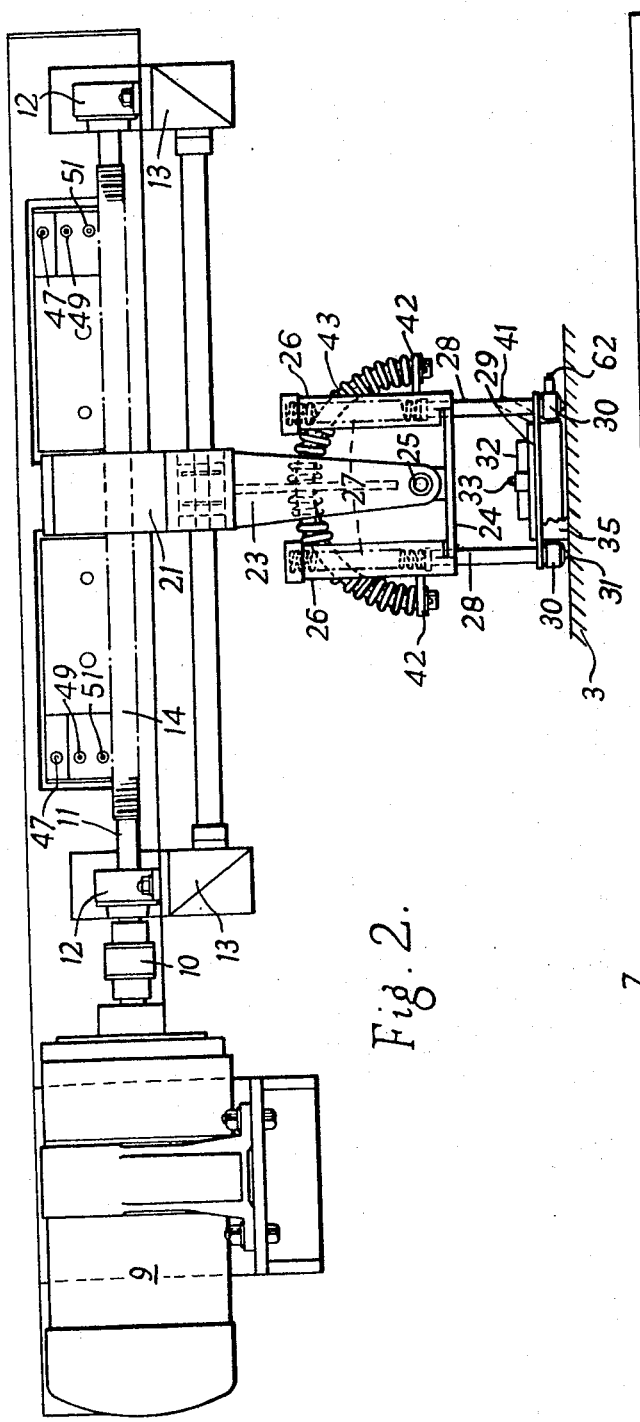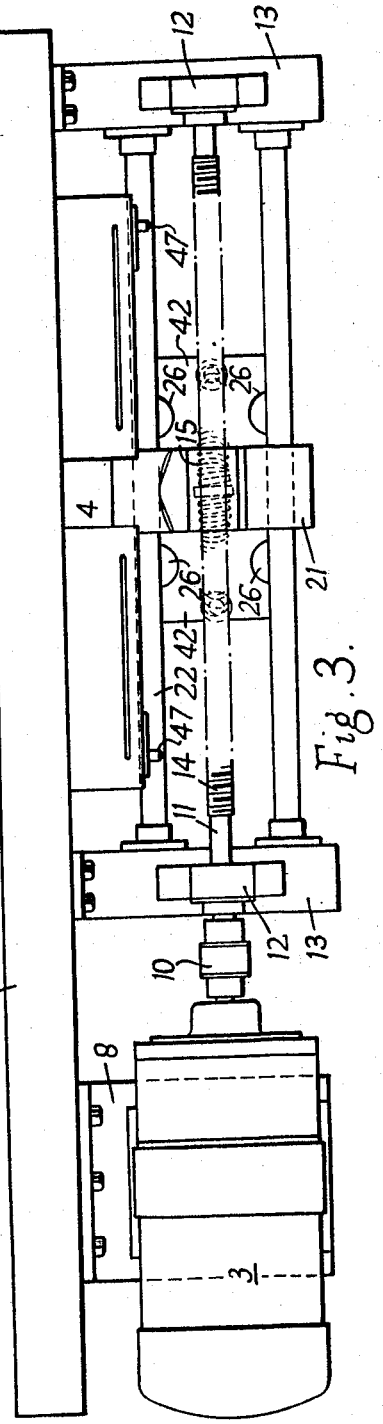

United States Patent Office 3,326,037
Patented June 20, 1967

3,326,037
ULTRASONIC EXAMINATION APPARATUS
John Stewart, Paisley, Scotland, assignor to Babcock & Wilcox, Limited, London, England, a corporation of Great Britain
Filed Mar. 17, 1964, Ser. No. 352,452
Claims priority, application Great Britain, Mar. 18, 1963, 10,698/63
8 Claims. (Cl. 73—67.8)

This invention relates to the ultrasonic examination of longitudinally extended regions of workpieces and an object thereof is to provide apparatus for use in such ultrasonic examination which is adapted for effective mechanical traversing of probe means in effective operational engagement with the workpiece.

The invention includes apparatus for use in ultrasonic examination of a longitudinally extended region of a workpiece, having means for effecting traversing in relation to a surface of the workpiece to a side of the said region in a relative movement having a component of motion in the longitudinal direction of said region and a reciprocatory movement transverse to said direction, ultrasonic probe means adapted for transmitting ultrasonic waves through said surface obliquely into the workpiece towards the said region thereof and receiving ultrasonic echo waves arriving obliquely at said surface from the said region of the workpiece, wherein the probe means are mounted on a probe holder which is carried by a carriage capable of rocking on a crosshead which is arranged for driving the probe means in reciprocatory movement, the axis of rocking being normal to the direction of reciprocatory movement, and means are provided for urging the probe holder in a direction towards the workpiece surface.

The invention also includes, for use in apparatus for effecting an ultrasonic examination of a longitudinally extended region of a workpiece, a machine for effecting a reciprocatory movement of ultrasonic probe means over a workpiece surface, including a probe holder for mounting the probe means and carried by a carriage capable of rocking on a crosshead, the axis of rocking being normal to the direction of reciprocatory movement of the crosshead, means for urging the probe holder towards the workpiece surface and a reversible electric motor for driving the crosshead, the direction of rotation of which is controller by reversing contacts operated by a member moving with the crosshead.

The invention will now be described by way of example with reference to the accompanying drawings, in which:

FIGURE 2 is a rear elevation to a larger scale of part of the apparatus indicated in FIGURE 1;

FIGURE 3 is a plan of the parts of the apparatus shown in FIGURE 2;

Figure 1:
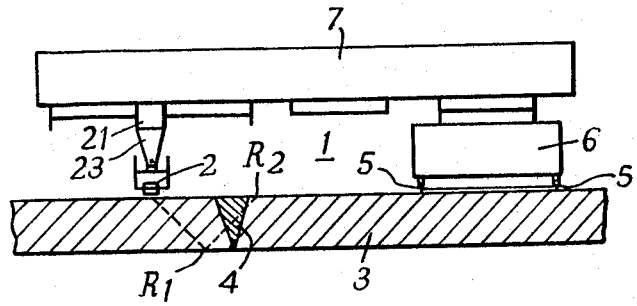
FIGURE 1 is a diagrammatic elevation of probe traversing apparatus arranged for the ultrasonic examination of a butt weld seam in a workpiece.
Figure 5:
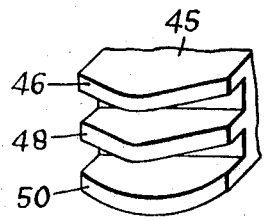
FIGURE 5 is a perspective view of a part of the apparatus.

Referring to FIGURE 1 of the drawing, a machine 1 for traversing ultrasonic probe means 2 over a surface of a workpiece 3 having a weld seam 4 therein includes a rail track 5 resting on the said surface and extending longitudinally of the weld seam and on which a wheeled carriage 6 runs which is driven at the rate of about six inches per minute along the track by an electric motor (not shown) mounted in the carriage. Extending from the carriage laterally of the track and over part of the workpiece surface to be traversed by the probe means is a rigid-arm 7 which carries means for reciprocating the probe means longitudinally of the arm. As the machine is arranged in FIGURE 1, the track extends longitudinally of the weld seam to one side of the weld seam while the probe means traverses a surface of the workpiece to the other side of the track.

Referring to FIGURES 1 to 5, the arm 7 near its inner end carries on a bracket 8 to a reversible electric motor 9 the shaft of which is coupled through a resilient coupling 10 with a spindle 11 extending parallel to the arm and mounted in suitable bearing 12 in brackets 13 thereon. The spindle 11 bears a two-start lead screw 14 with which there engages a nut 15 which is part of a cross-head 21 which is prevented from rotating by a pair of guide rods 22 secured at their ends at the brackets 13 which carry the spindle bearings 12.

A downwardly extending part 23 of the cross-head 21 carries a rectangular carriage plate 24 arranged to be able to rock around the axis of a fulcrum pin 25 in the said cross-head part 23, the said axis being parallel to the workpiece surface and normal to the axis of the lead screw spindle. The carriage plate 24 carries on its upper surface at the respective corners thereof cylinders 26 which house compression springs 27 bearing downwardly on the respective upper ends of respective columns 28 which pass through respective apertures in the carriage plate 24 and to which a probe holder 29 is secured. The lower ends of the columns 28 terminate in housings 30 for respective roller castors 31 adapted to contact the workpiece surface. The probe means includes a suitable casing 32 which is located in relation to the probe holder 29 by adjusting screws 33.

The probe means is suitably of the kind shown and described in British patent specification No. 778,166, having two similar and similarly shaped blocks, one for transmitting and one for receiving and arranged side by side but suitably isolated from one another, of suitable material for example that known by the name "Perspex," which blocks have piezo-electric crystals contacting faces thereof. The transmitting and receiving surfaces of the blocks are co-planar, and the probe means, which is energized to deliver waves in pulses of ultrasonic oscillations obliquely downwardly into the workpiece metal, is oriented so that the waves travel in the metal towards the weld seam. The screws 33 are adjusted so that the lower, operative faces of the blocks are spaced a short distance from the workpiece surface. Extending downwardly from the probe holder 29 and encircling the region of the probe is a rubber skirt 35 the lower edge of which sweeps the workpiece surface and which is adapted to retain a bath of coupling liquid through which ultrasonic waves are transmitted between the blocks and the workpiece surface. The liquid must wet the workpiece surface and may, for example, be oil, soft water or water with an addition of detergent. A liquid reservoir (not shown) is provided, suitably on the carriage 6, and a connection therefrom suitably by rubber pipe 41 is provided for replacing an inevitable loss of liquid from the bath as the probe means is traversed over the workpiece surface.

The four cylinders 26 carry a pair of brackets 42 for holding the ends of a guide 43, extending arcuately around the fulcrum pin axis and extending through an aperture in the downwardly extending cross-head part 23, for a pair of compression springs 44 coiled around the guide 43 which are arranged one on one side and the other on the other side of the said cross-head part and each of which extends between a respective bracket 42 and the said cross-head part and which act to urge the carriage plate and therewith the probe holder 29 and the probe means to a neutral angular position with respect to the fulcrum pin in which the probe means operative faces are parallel to the lead screw spindle axis.

The cross-head carries a contact-operating member 45 of which one finger or element 46 is adapted at the two desired extreme positions of the cross-head movment to contact respective microswitches 47; said microswitches are in circuits (not shown) which control relay coils positioning contacts in the power supply to the reversible electric motor 9 and which are arranged so that the motor is automatically reversed in direction upon the cross-head reaching each extreme position. The motor speed is such that the probe means makes about 24 reversals of direction per minute.

A second finger or element 48 of the contact-operating member 45 is arranged to contact, at the two extreme positions of the cross-head movement, respective microswitches 49 the purpose of which will be later described. A third finger or element 50 of the contact-operating member 45 is arranged to contact, towards the two extreme positions of the cross-head movement, respective further microswitches 51 the purpose of which will also be later described; the arrangement is such that each further microswitch 51 is operated against its bias somewhat before the appropriate extreme position of the cross-head is reached and is not permitted to resume its normal state until somewhat after the extreme position has been left.

In the operation of the apparatus the wheeled carriage 6 is driven along the track 5 by the appropriate electric motor while the cross-head 21 is reciprocated by the reversible electric motor 9. The probe means 2 traverses the workpiece surface with a component of movement parallel to the weld seam 4 and a reciprocating movement transverse to the weld seam. The probe holder 29 carrying the probe means is urged towards the workpiece surface and accommodates itself to said surface. The probe means is used under the same conditions throughout its traverse over the workpiece surface without normally any or any great variation in the coupling effectiveness, whereby the weld region to be examined may be swept by waves of the same intensity throughout and the echoes from flaws, if any, may be received in proportion to the intensity of the echoes.

Figures 6A, 6B:
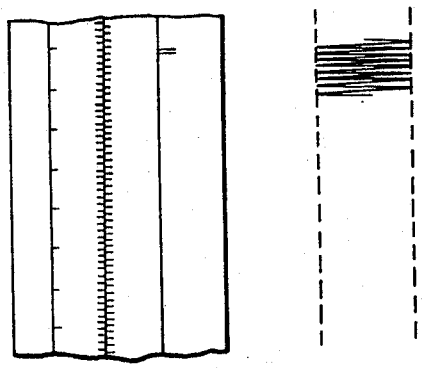
FIGURE 6A represents forms of record made on a band of recording paper.
FIGURE 6B shows movements of probe means over the workpiece surface represented by part of the record of FIGURE 6A.
Figure 4:
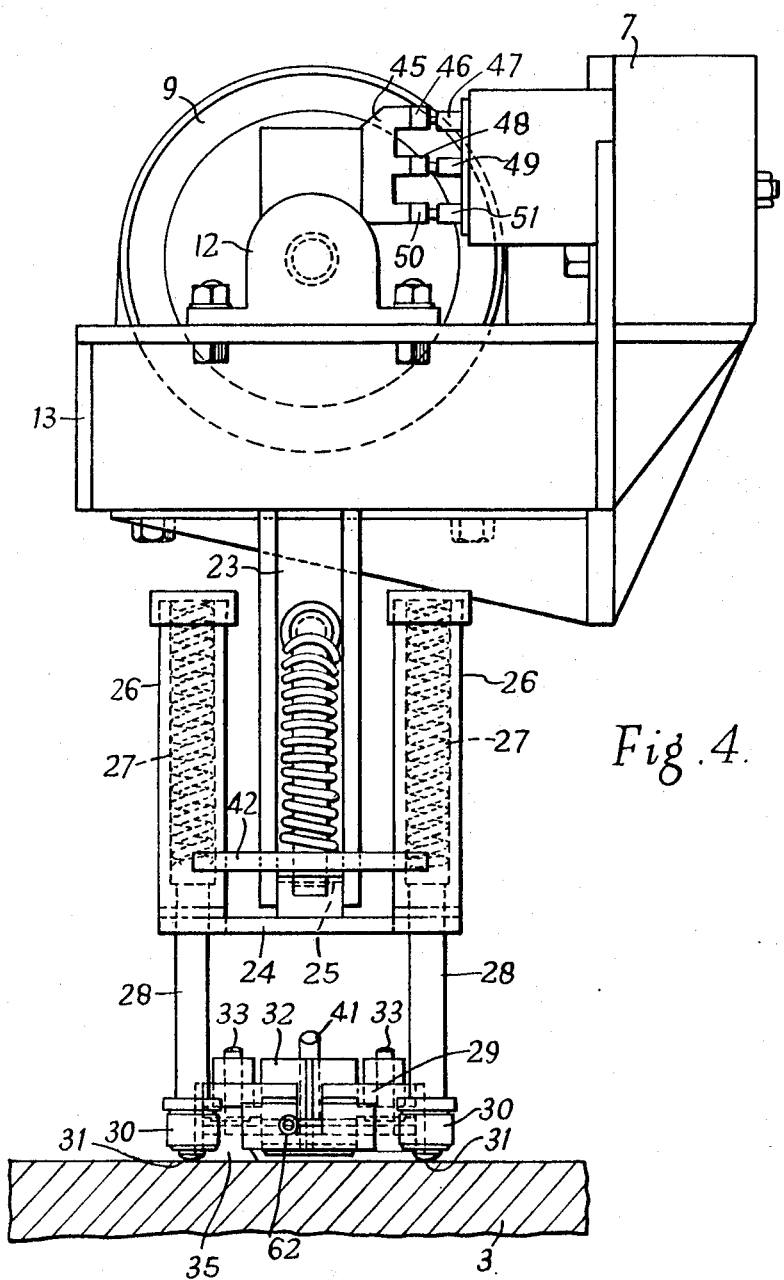
FIGURE 4 is an end elevation of the parts of the apparatus shown in FIGURE 2.

A record of the examination which might serve as an ultrasonic inspection record may be made on a continuously moving paper band 61 (FIGURE 6A) in suitable recording apparatus (not shown) in which are the pens of three pen recorders, each of which, when stationary, draws a straight line on the band. For recording movement of the probe means longitudinally of the weld seam under examination one of the pen recorders is operated periodically so that the pen thereof moves temporarily aside from the straight line normally drawn, the moments of operation being determined by the successive arrival of the probe means at locations spaced along the workpiece surface. Signals for the operation of the said pen recorder may come from the operation of a microswitch (not shown) on the wheeled carriage 6 as it successively passes spaced contact-operating members (not shown) arranged along the track. Alternatively, the probe holder 29 carrying the probe means may be provided with a microswitch 62 arranged to be operated at or towards an extreme position of the probe means in its reciprocatory movement when it impinges on any one of a plurality of stationary contact operating devices, for example pot magnets, placed by hand on the workpiece surface in a row extending parallel to the weld seam. The pen recorder may be of the kind in which the pen moves temporarily laterally of its normal line trace when the recorder receives the discharge of a condenser and the condenser is normally charged through a charging circuit but is discharged through the pen recorder whenever the microswitch is closed. Thus a record such as the left-hand of the three traces shown on the paper band 61 in FIGURE 6A may be made.

For recording reciprocatory movement of the probe means another of the pen recorders is operated periodically so that the pen thereof moves temporarily aside from the straight line normally traced by that pen whenever the probe means reaches an extreme point in its reciprocating movement, the pen moving to one side of the line to record one extreme point of the reciprocatory movement and to the other side of the line to record the other extreme point of the reciprocating movement. To effect such movement of said pen, two further condensers may be arranged to give respectively opposite discharges through the recorder when the microswitches 49 are closed alternately by the finger or element 48 when the cross-head 21 reaches respective extreme points in its reciprocatory movement. Thus a second record such as the center of the three traces shown on the paper band 61 in FIGURE 6A may be made, representing probe means movement such as that shown in FIGURE 6B.

Echo waves which are reflected by a flaw, in the workpiece metal being examined and on which transmitted waves impinge, will travel back along or close to the same path as the transmitted waves and enter the receiving block of the probe means generate pulses of ultrasonic electric oscillations at the appropriate crystal; such electric oscillations, when they are generated at the crystal, are applied for the making of a third record by the third pen recorder.

Thus, such electric oscillations are applied to a network the output of which is normally zero but which is a direct current when such oscillations are received and such output is applied to the third pen recorder so that the pen thereof departs from the normal line trace thereof on the moving band 61 when the oscillations are received. The network is such that the pen records a greater departure from the normal line trace the greater the strength of the echo waves. Thus a record such as the right-hand of the three traces shown on the paper band 61 in FIGURE 6A may be made, if a flaw is present in the workpiece metal.

It will be understood that a cathode ray oscilloscope will be generally provided and controlled, as described in British patent specification No. 778,166 by electric oscillations arising from echo waves and by a sweep circuit triggered by the pulse generator of oscillations for the transmitting crystal to indicate visually on the oscilloscope face the existence of echo waves, the strength of the echo waves if received, and, in the form of a distance between blips on the face, the time interval between the transmission of each pulse and the reception of echo waves arising from such pulse, which time interval is a measure of the distance from the probe means, taken along the path of the waves, of the flaw reflecting the echo waves.

The microswitches 51 contacted by the finger or element 50 of the contact-operating member 45 are arranged in a circuit adapted to prevent the passage of signals to the third pen recorder to record echo reception during the periods of time when reversal of the motor 9 takes place, during which period it is found that electro-magnetic disturbances occur that might otherwise result in confusion of the third record.

It is found that oscillations may arrive at the receiving crystal very soon after the transmission of a pulse of ultrasonic waves from the transmitting crystal which oscillations do not indicate flaws and we exclude such oscillations from the third record by use of a gating circuit which is actuated by the pulse generator or by the oscilloscope circuit triggered thereby and is adjustable so that only signals are passed to the third record which arise from echo waves each received by the receiving crystal at greater than a minimum time interval after the corresponding transmitting pulse. Preferably, the block faces bearing the transmitting and receiving crystals for inspection are angled so that the waves travel from the transmitting block sufficiently downwardly to be internally reflected from the opposite face of the workpiece and the probe means is traversed in reciprocating movement at such distance from the weld that the transmitted waves sweep through the weld region after the internal reflection and the received signals are gated so as to exclude from the third record signals other than those arising from flaws infringed upon by the transmitted waves after the first internal reflection thereof, as at R1 in FIGURE 1, and before the second internal reflection thereof as at R2 in FIGURE 1.

The record of the whole examination may readily be arranged to be such as to be viewed at a glance if desired. If no flaws are present in the weld region swept by ultrasonic waves, the fact is readily appreciated since spurious signals have been blocked from operating the third pen recorder. If a flaw is present the fact is immediately evident and the correlated first, second and third records will quickly give the desired indication of the location of the probe means when the flaw was detected, after which a further examination may be carried out by manually positioned probe means, in preparation for the repair of the unsound metal. The ease of interpretation of the inspection record does not depend upon the respective speeds at which it is arranged that the two motors are driven.

The weld seam examined may be a weld in a cylindrical pressure vessel which extends longitudinally of the pressure vessel and the probe holder 29 carrying the probe means, urged towards the pressure vessel surface, accommodates itself to the curvature of said surface. The weld seam examined may be other than rectilinear, e.g. in a circumferential region of a cylindrical pressure vessel. In the examination of a region of a cylindrical pressure vessel including a circumferential seam weld therein, means may be provided for rotating the pressure vessel while it is supported with its axis horizontal.

What we claim is:

1. Apparatus for ultrasonically testing a longitudinally extended region of a workpiece comprising ultrasonic probe means, means including a crosshead overlying said workpiece for traversing said probe means over a surface of the workpiece to a side of said region in a relative movement having a component of motion in the longitudinal direction of said region and a reciprocatory movement transverse to said direction, said traversing means including a lead screw disposed above and normal to the longitudinal direction of said region, said probe means being adapted for transmitting ultrasonic waves through said surface obliquely into the workpiece toward said region and receiving ultrasonic echo waves arriving obliquely at said surface from said region of said workpiece, a pair of reversing switches disposed adjacent the ends of said lead screw, a contact member connected to said crosshead and having contact surfaces arranged to engage said reversing switches at the ends of travel of said crosshead along said lead screw, a carriage pivotly connected to said crosshead so as to be capable of rocking relative thereto, the axis of rocking being in a direction normal to said reciprocatory movement, a probe holder connected to said carriage, said probe means being mounted on said probe holder, means for continuously urging said probe holder in a direction toward said surface of the workpiece, a reversible motor operatively associated with said traversing means for effecting reciprocatory movement thereof, said reversing switches effecting reversal of said motor at the ends of travel of said crosshead along said lead screw, means for recording the traversing movements of said probe means and of changes in the level of echoes received from said region, and means responsive to actuation by said contact member for deactivating said recording means during periods of time when reversals of said motor are taking place.

2. Apparatus for ultrasonically testing a longitudinally extended region of a workpiece comprising ultrasonic probe means, traversing means for moving said probe means over a surface of the workpiece in a relative movement having a component of motion in the longitudinal direction of said region and a reciprocatory movement transverse to said direction, said probe means being adapted for transmitting ultrasonic waves through said surface obliquely into the workpiece toward said region and receiving ultrasonic echo waves arriving obliquely at said surface from said region of said workpiece, said traversing means including a lead screw disposed above and normal to the longitudinal direction of said region, a reversible motor connected to said lead screw to effect rotation thereof, a downwardly extending crosshead having a nut portion threadably engaged with said lead screw, and means for preventing rotation of said nut portion relative to said lead screw so that rotary movement of said lead screw are translated into linear movements of said crosshead along said lead screw, recorder means for producing a continuous record of the traversing movements of said probe means and of changes in the level of echoes received from said region, a carriage connected to the lower end of said crosshead, a probe holder connected to said carriage, said probe means being mounted on said probe holder, means for continuously urging said probe holder in a direction toward said surface of the workpiece, and a pair of cut-out switches disposed adjacent the ends of said lead screw and operatively associated with said recorder means, said cut-out switches being effective to preclude the recording of echo level changes received from said region during periods of time when the reversal of said motor is taking place, a contact member connected to said crosshead and having contact surfaces arranged to engage said cut-out switches at the ends of travel of said crosshead along said lead screw.

3. Apparatus for ultrasonically testing a longitudinally extended region of a workpiece comprising ultrasonic probe means having a working face, means for traversing said probe means over a surface of the workpiece in a relative movement having a component of motion in the longitudinal direction of said region and a reciprocatory movement transverse to said direction, a downwardly extending crosshead overlying said workpiece and arranged for effecting said reciprocatory movement, a carriage pivotly connected to said crosshead so as to be capable of rocking relative thereto, the axis of rocking being in a direction normal to said reciprocatory movement, guide means connected to said carriage and extending arcuately around the rocking axis of said carriage, spring means arranged on said guide means and interconnecting said carriage and said crosshead on opposite sides thereof for angularly biasing the carriage toward a position in which the working face of the probe means is parallel to the direction of said reciprocatory movement, a probe holder connected to said carriage, said probe means being mounted on said probe holder, and means including springs interconnecting said carriage and said probe holder for continuously urging said probe holder in a direction toward said surface of the workpiece.

4. Apparatus for ultrasonically testing a longitudinally extended region of a workpiece comprising probe means having a working face, traversing means for moving said probe means over a surface of the workpiece in a relative movement having a component of motion in the longitudinal direction of said region and a reciprocatory movement transverse to said direction, said probe means being adapted for transmitting ultrasonic waves through said surface obliquely into the workpiece toward said region and receiving ultrasonic echo waves arriving obliquely at said surface from said region, said traversing means including a lead screw disposed above and normal to the longitudinal direction of said region, a downwardly extending crosshead threadably engaged with said lead screw, and means for effecting said reciprocatory movement of said crosshead back and forth along said lead screw, recorder means for producing a continuous record of the traversing movements of said probe means and of changes in the level of echoes received from said region, a pair of reversing switches disposed adjacent the ends of said lead screw, a pair of marking switches operatively associated with said recorder means and disposed adjacent the ends of said lead screw, a contact member connected to said crosshead and having contact surfaces arranged to engage said reversing and marking switches at the ends of travel of said crosshead along said lead screw, a carriage pivotly connected to said crosshead so as to be capable of rocking relative thereto, the axis of rocking being in a direction normal to said reciprocatory movement, guide means interconnecting said carriage and said crosshead on opposite sides thereof for angularly biasing the carriage toward a position in which the working face of the probe means is parallel to the direction of said reciprocatory movement, a probe holder connected to said carriage, said probe means being mounted on said probe holder, and means interconnecting said probe holder with said carriage for continuously urging said probe holder in a direction toward said workpiece.

5. Apparatus for ultrasonically testing a longitudinally extended region of a workpiece comprising probe means having a working face, traversing means for moving said probe means over a surface of the workpiece to a side of said region in a relative movement having a component of motion in the longitudinal direction of said region and a reciprocatory movement transverse to said direction, said probe means being adapted for transmitting ultrasonic waves through said surface obliquely into the workpiece toward said region and receiving ultrasonic echo waves arriving obliquely at said surface from said region, said traversing means including a lead screw having a downwardly extending crosshead threadably engaged therewith, and means for moving said crosshead along said lead screw in alternately reversing directions to effect said reciprocatory movement, a carriage pivotly connected to the lower end of said crosshead so as to be capable of rocking realtive thereto, the axis of rocking being in a direction normal to said reciprocatory movement, guide means connected to said carriage and extending arcuately around the rocking axis of said carriage, spring means arranged on said guide means and interconnecting said carriage and said crosshead on opposite sides thereof for angularly biasing the carriage toward a position in which the working face of the probe means is parallel to the direction of said reciprocatory movement, a probe holder connected to said carriage, said probe means being mounted on said probe holder, and means including springs interconnecting said probe holder with said carriage for continuously urging said probe holder in a direction toward said workpiece.

6. Apparatus for ultrasonically testing a longitudinally extended region of a workpiece comprising probe means having a working face, traversing means for moving said probe means over a surface of the workpiece to a side of said region in a relative movement having a component of motion in the longitudinal direction of said region and a reciprocatory movement transverse to said direction, said probe means being adapted for transmitting ultrasonic waves through said surface obliquely into the workpiece toward said region and receiving ultrasonic echo waves arriving obliquely at said surface from said region, said traversing means including a lead screw disposed normal to the longitudinal direction of said region and having a crosshead threadably engaged therewith, and means for moving said crosshead along said lead screw in alternately reversing directions to effect said reciprocatory movement, recorder means for producing a continuous record of the traversing movements of said probe means and of changes in the level of echoes received from said region, a pair of reversing switches electrically connected with said motor and disposed adjacent the ends of said lead screw, a pair of marking switches operatively associated with said recorder means and disposed adjacent the ends of said lead screw, a pair of cut-out switches disposed adjacent the ends of said lead screw and operatively associated with said recorder means, said cut-out switches being effective to preclude the recording of echo level changes received from said region during periods of time when the reversal of said motor is taking place, a contact member connected to said crosshead and having contact surfaces arranged to engage said reversing, marking and cut-out switches at the ends of travel of said crosshead along said lead screw, a carriage connected to said crosshead, a probe holder connected to said carriage, said probe means being mounted on said probe holder, and means interconnecting said probe holder with said carriage for continuously urging said probe holder in a direction toward said workpiece.

7. Apparatus for ultrasonically testing a longitudinally extended region of a workpiece comprising probe means having a working face, traversing means for moving said probe means over a surface of the workpiece to a side of said region in a relative movement having a component of motion in the longitudinal direction of said region and a reciprocatory movement transverse to said direction, said probe means being adapted for transmitting ultrasonic waves through said surface obliquely into the workpiece toward said region and receiving ultrasonic echo waves arriving obliquely at said surface from said region, said traversing means including a lead screw disposed above and normal to the longitudinal direction of said region, a reversible motor connected to said lead screw to effect rotation thereof, a downwardly extending crosshead having a nut portion threadably engaged with said lead screw, and means for preventing rotation of said nut portion relative to said lead screw so that rotary movements of said lead screw are translated into linear movements of said crosshead along said lead screw, a pair of reversing switches electrically connected with said motor and disposed adjacent the ends of said lead screw, a contact member connected to said crosshead and having contact surfaces arranged to engage said reversing switches at the ends of travel of said crosshead along said lead screw, said reversing switches and said motor cooperating to alternately reverse the direction of movement of said crosshead to effect said reciprocatory movement, a carriage connected to said crosshead, a probe holder connected to said carriage, said probe means being mounted on said probe holder, means interconnecting said probe holder with said carriage for continuously urging said probe holder in a direction toward said workpiece, means for recording the traversing movements of said probe means and of changes in the level of echoes received from said region, and switch means engageable with said contact member at the ends of travel of said crosshead along said lead screw for deactivating said recording means during periods of time when reversals of said motor are taking place.

8. Apparatus for ultrasonically testing a longitudinally extended region of a workpiece comprising probe means having a working face, traversing means for moving said probe means over a surface of the workpiece to a side of said region in a relative movement having a component of motion in the longitudinal direction of said region and a reciprocatory movement transverse to said direction, said probe means being adapted for transmitting ultrasonic waves through said surface obliquely into the workpiece toward said region and receiving ultrasonic echo waves arriving obliquely at said surface from said region, said traversing means including a lead screw disposed above and normal to the longitudinal direction of said region, a reversible motor connected to said lead screw to effect rotation thereof, a downwardly extending crosshead having a nut portion threadably engaged with said lead screw, and means for preventing rotation of said nut portion relative to said lead screw so that rotary movements of said lead screw are translated into linear movements of said crosshead along said lead screw, recorder means for producing a continuous record of the traversing movements of said probe means and of changes in the level of echoes received from said region, a pair of reversing switches electrically connected with said motor and disposed adjacent the ends of said lead screw, a pair of marking switches operatively associated with said recorder means and disposed adjacent the ends of said lead screw, a pair of cut-out switches disposed adjacent the ends of said lead screw and operatively associated with said recorder means, said cut-out switches being effective to preclude the recording of echo level changes received from said region during periods of time when the reversal of said motor is taking place, a contact member connected to said crosshead and having contact surfaces arranged to engage said reversing, marking and cut-out switches at the ends of travel of said crosshead along said lead screw, said reversing switches and said motor cooperating to alternately reverse the direction of movement of said crosshead to effect said reciprocatory movement, a carriage pivotly connected to said crosshead so as to be capable of rocking relative thereto, the axis of rocking being in a direction normal to said reciprocatory movement, guide means connected to said carriage and extending arcuately around the rocking axis of said carriage, spring means arranged on said guide means and interconnecting said carriage and said crosshead on opposite sides thereof for angularly biasing the carriage toward a position in which the working face of the probe means is parallel to the direction of said reciprocatory movement, a probe holder connected to said carriage, said probe means being mounted on said probe holder, and means including springs interconnecting said probe holder with said carriage for continuously urging said probe holder in a direction toward said workpiece.

References Cited

UNITED STATES PATENTS

| | | |
|---|---|---|
| 2,740,289 | 4/1956 | Van Valkenburg et al. _ 73—67.9 |
| 2,969,671 | 1/1961 | Sproule _____ 73—67.9 |
| 3,100,987 | 8/1963 | Bincer _____ 73—67.7 |
| 3,159,756 | 12/1964 | Beaujard et al. ____ 73—67.8 X |
| 3,178,933 | 4/1965 | Bloch et al. _____ 73—67.8 |

FOREIGN PATENTS 627,946   5/1933   Canada.

RICHARD C. QUEISSER, *Primary Examiner.*

J. P. BEAUCHAMP, *Assistant Examiner.*